United States Patent [19]
Yellin

[11] Patent Number: 6,047,035
[45] Date of Patent: Apr. 4, 2000

[54] METHOD AND DEVICE FOR QUANTIZING THE INPUT TO SOFT DECODERS

[75] Inventor: Daniel Yellin, Karmei Yosef, Israel

[73] Assignee: DSPC Israel Ltd., Givat Shmuel, Israel

[21] Appl. No.: 09/103,683

[22] Filed: Jun. 15, 1998

[51] Int. Cl.$^7$ .............................. H03D 1/04; H03D 1/06; H03K 5/01; H03K 6/04; H04B 1/10
[52] U.S. Cl. .................. 375/346; 375/262; 375/265; 375/341; 375/347; 375/348; 455/504; 455/506; 371/43.7
[58] Field of Search ...................... 375/346, 262, 375/265, 341, 347, 348; 455/10, 504, 506; 371/43.7

[56] References Cited

U.S. PATENT DOCUMENTS

| | | | |
|---|---|---|---|
| 4,309,772 | 1/1982 | Kloker et al. | 375/317 |
| 4,328,585 | 5/1982 | Monsen | 375/233 |
| 5,305,349 | 4/1994 | Dent . | |
| 5,305,351 | 4/1994 | Mizoguchi | 375/232 |
| 5,572,552 | 11/1996 | Dent et al. | 375/343 |
| 5,671,221 | 9/1997 | Yang | 370/320 |
| 5,710,793 | 1/1998 | Greenberg | 375/232 |
| 5,761,237 | 6/1998 | Petersen et al. | 375/200 |
| 5,881,094 | 3/1999 | Schilling | 375/202 |

OTHER PUBLICATIONS

C.E. Shannon, Bell System Technical Journal, 27:379–423, 1948.
G.C. Clark et al., Error–Correction Coding for Digital Communications, 1981.
J. Salz et al., IEEE Transactions on Communications, 43:307–317, 1995.
I.M. Onyszchuk et al., IEEE Transactions on Communications, 41:261–265, 1993.

*Primary Examiner*—Stephen Chin
*Assistant Examiner*—Michael W. Maddox
*Attorney, Agent, or Firm*—Darby & Darby

[57] ABSTRACT

A receiver including a signal reception unit, for receiving a signal from a dynamically fading channel, a demodulator, connected to the signal reception unit, for demodulating the received signal, thereby producing a demodulated signal therefrom, a quantizing processor, connected to the demodulator and to the signal reception unit, for analyzing the received signal and for quantizing the demodulated signal, thereby producing a quantized signal, and a decoder, connected to the quantzing processor, for decoding the quantized signal, wherein the quantizing processor normalizes the demodulated signal according to the estimated fading of the received signal.

18 Claims, 5 Drawing Sheets

METHOD AND DEVICE FOR QUANTIZING THE INPUT TO SOFT DECODERS

FIELD OF THE INVENTION

The present invention relates to a method and a device for quantizing the input to a soft decoder and to a method and a device for quantizing the input to a Viterbi decoder, operating over fading channels, in particular.

BACKGROUND OF THE INVENTION

The classical problem of quantizing an analog signal into some set of a-priori chosen discrete-alphabet values, was extensively studied following the pioneering work of Shannon on rate distortion theory published in 1948 by C. E. Shannon, "A mathematical theory of communication" Bell System Technical Journal, 27, 1948.

Various quantization methods are known to those skilled in the art. In general, each of these methods utilizes a specific cost function. The object of a quantIzer is to minimize the respective quantization cost.

In digital communication applications, digital information is modulated onto a carrier signal which is then, transmitted over an analog channel. The output of the channel is sampled, quantized and processed by the receiver in order to recover the transmitted digital information.

The natural cost function which is used in this case is the probability of error. The objective of the quantization strategy is to minimize the probability of incorrectly receiving the transmitted information.

Unfortunately, analytically minimizing this cost function is mathematically intractable even for relatively simple scenarios (see e.g. Salz and Zehavi). Accordingly, ad-hock solutions are often used.

Reference is now made to FIG. 1, which is a schematic illustration of a digital communication receiver, generally referenced 10, known in the art.

System 10 includes an analog to digital (A/D) converter 12, a demodulator 14, an automatic-gain-control (AGC) unit 15, a quantizer 16, and a decoder 18.

The transmitted signal is picked-up by the receivers antenna and is then amplified and filtered at the receiver's front-end (not shown in FIG. 1). The resulting signal is fed into system 10 at the input of the A/D 12.

The A/D 12 converts the signal to digital samples and provides them to the demodulator 14. The demodulator 14 processes the digitized samples and produces a demodulated signal Y[n]. The AGC unit 15 normalizes the demodulated signal Y[n], to fit into the dynamic range of the quantizer 16, as follows $$\tilde{Y}[n] = AGC\_Gain \cdot Y[n] \quad \text{Equaton 1}$$

where AGC_Gain may vary from sample to sample.

The quantizer 16 processes the normalized samples $\tilde{Y}[n]$, thereby producing the quantized samples $Q(\tilde{Y}[n])$ such that each sample is represented by B bits. In most cases, $Q(\tilde{Y}[n])$ is simply the nearest element to $\tilde{Y}[n]$ in the set of $2^B$ possible quantization levels. The quantized samples are provided to the decoder 17, which in turn attempts to recover the transmitted information.

It is noted that system 10 is a mere example to systems which are known in the art. Those skilled in the art are familiar with several other configurations. For example, in a spread-spectrum CDMA (Code Division Multiple Access) environment operating on a multi-path fading channel, the demodulator is replaced by a rake demodulator. A rake demodulator includes a plurality of demodulating fingers, each of which attempts to detect and demodulate a different replica of the transmitted signal.

According to another example, an analog demodulator may be utilized. In this case, an A/D converter is placed after the demodulator, sometimes also serving as a quantizer.

However, regardless of the specific receiver type and structure, its complexity, or more particularly, the complexity of the decoder, increases with B—the number of bits used to represent each quantized sample $Q(\tilde{Y}[n])$. Therefore, it is desirable to choose a quantization strategy that minimizes B.

The minimal possible value for B is B=1, which is called "Hard Decision". In this case the numbers produced by the quantizer are restricted to have only two possible values "one" and "zero". All other situations are called "Soft Decision" and correspond to the case where B>1.

When hard-decision is used, only the sign of $\tilde{Y}[n]$ is fed into the decoder, thus completely ignoring any information conveyed by its magnitude. Therefore, hard-decision decoding, although very simple to implement, can lead to a significant degradation in performance.

On the other hand, when B is very large, the full potential of the code is utilized. It will be noted however, that in this case, the decoder complexity is high. It is therefore desirable to come-up with an efficient quantization strategy that allows good tradeoff between decoder complexity and quantization loss.

Methods for quantizing the input to a soft decoder operating over a static AWGN channel are described in Onyszchuk et. al. In this case, the demodulated signal can be represented by $$Y[n] = h \cdot S[n] + W[n] \quad \text{Equation 2}$$

where S[n] is the desired (information bearing) signal that needs to be decoded, h is the complex valued channel gain, and W[n] is an additive white Gaussian noise term.

The conventional quantization strategy for such channels is based on first normalizing the RMS (Root Mean Square) value of Y[n] to a predetermined vague denoted by Desired_RMS, and then applying a uniform quantizer e.g. a conventional A/D converter. The normalization operation is performed by the AGC according to Equation 1, by setting $$AGC\_Gain = \frac{Desired\_RMS}{Estimated\_RMS} \quad \text{Equation 3}$$

where the Estimated_RMS may be computed in a variety of ways, e.g.

$$Estimated\_RMS = \sqrt{\frac{1}{N} \cdot \sum_{n=1}^{N} |Y[n]|^2} \quad \text{Equation 4}$$

This quantization strategy performs well when the channel is static, (i.e. the model in Equation 2 holds).

However, when implemented for non-static channels, this approach can lead to a significant degradation in performance. In order to clarify this, we now consider a simple generalization of Equation 2, in which $$Y[n] = h[n] \cdot S[n] + W[n] \quad \text{Equation 5}$$

where, as before, Y[n] is the demodulated signal; S[n] is the information bearing signal; W[n] is the additive white Gaussian noise term; and h[n] is the complex valued channel gain which is now allowed to be time varying.

Reference is now made to FIGS. 2A, 2B, 2C and 2D.

FIG. 2A is an illustration of a frame of a transmitted signal, generally referenced 140A. The signal is divided into a plurality of sections 150A, 152A, 154A, 156A, 158A and 160A, each including a plurality of symbols represented by dots. For example, section 150A includes five symbols. The first three symbols and the fifth symbol, are of a value of +1, while the fourth symbol is of a value of −1.

FIG. 2B is an illustration of a dynamically fading channel where we plotted only its magnitude |h[n]|, generally referenced 142. Each of the dots along the line represents the gain of the channel at a point in time which is respective to a symbol of signal 140A (FIG. 2A).

FIG. 2C is an illustration of the demodulated signal Y[n] of the received frame in the absence of noise according to the simple model of Equation 5, generally referenced 140B. Each of the samples in the demodulated signal 140B is, in general, a multiplication of a selected transmitted symbol of signal 140A (FIG. 2A) and the respective fading value of the channel 142 (FIG. 2S).

FIG. 2D is an illustration of the quantized signal $Q(\tilde{Y}[n])$, produced from signal 140B, when AGC_Gain is set to unity and the following five level uniform quantizer utilized, $$Q(\tilde{Y}[n]) = \begin{cases} 1 & \text{if } \tilde{Y}[n] > 0.75 \\ 0.5 & \text{if } 0.75 \geq \tilde{Y}[n] > 0.25 \\ 0 & \text{if } 0.25 \geq \tilde{Y}[n] > -0.25 \\ -0.5 & \text{if } -0.25 \geq \tilde{Y}[n] > -0.75 \\ -1 & \text{if } \tilde{Y}[n] \leq -0.75 \end{cases} \quad \text{Equation 6}$$

Equation 6

As can be seen from Equation 5, Equation 6 and FIG. 2D, all samples for which the fade magnitude is smaller than 0.25, such as the samples in section 158B (FIG. 2C), are mapped by the quantizer to the value "0" (section 158C).

These are called erasures, since they contain no information on the actual transmitted bit—it can equally likely be a "1" or a "−1".

It will be appreciated by those skilled in the art (see for example: G. C. Clark Jr and J. Bibb Cain "Error—Correction Coding for Digital Communications" Chapter 5) that if the number of erasures is larger than a certain threshold related to the minimum distance of the code, then even an optimal decoder is likely to be in error.

Thus, whenever a deep channel fade occurs for a sufficiently long period, a decoding error will occur due to the quantization of the sampled data during the fade into erasures. This phenomenon happens regardless of the specific decoding method and/or decoding structure. Furthermore, even if erasures do not occur, decoding errors are still most likely to occur during channel fades, since the SNR (Signal-to-Noise Ratio) is low in these periods.

It is therefore clear that in a fading environment it is the quantization of the samples corresponding to low channel gain that attribute the most to the quantization loss.

One simple way to reduce the quantization loss is by using a larger value of Desired_RMS in Equation 3. With this approach, the signal is amplified so that its low magnitude portion is better mapped on the dynamic range of the quantizer. The price is of course worsening the mapping of the large magnitude portion of the signal that leads to clipping effects. Such clipping affects have a negligible affect on the overall performance, since they occur when the SNR is relatively high. Thus, overall an improvement in performance is achieved. However, if the channel happens to be static, the Desired_RMS value will no longer correspond to its optimal value resulting in an increase in quantization loss. Furthermore, even with fading channels, different Desired_RMS values are required for different fading characteristics. The approach presented below circumvents these issues.

SUMMARY OF THE PRESENT INVENTION

It is an object of the present invention to provide a novel system for quantizing the input signal for a soft decoder, operating over fading channels, which overcomes the disadvantages of the prior art.

In particular, it is the object of the present invention to provide a method for quantizing an input signal for a soft viterbi decoder, operating over fading channels, which overcomes the disadvantages of the prior art.

In accordance with one aspect of the present invention, there is thus provided a method for processing a received signal, which is received from a dynamically fading channel. The method includes the steps of:

detecting the fading characteristics of the fading channel, and determining a quantization correction command for at least one segment of the received signal.

The method can also include the step of quantizing the analyzed segment, according to the quantization correction command, thereby producing a quantized signal which is followed by a step of decoding the quantized signal.

The step of decoding the quantized signal can be performed while taking into account the quantization correction command associated with the decoded segment.

The method according to the invention, can also include the step of demodulating the received signal, either before or after the step of quantizing.

In accordance with another aspect of the present invention, the step of detecting includes the sub-steps of estimating the RMS of the received signal and computing the minimal and maximal quantities of the samples of the received signal.

In addition, the step of determining can include the sub-step of estimating a preferred RMS value.

The method can also include the step of normalizing the received signal according to the preferred RMS value.

The step of detecting can include the following sub-steps of estimating the RMS of the received signal, thereby producing an Estimated_RMS value, and estimating channel tap values ĥ[n] from the received signal. The step of determining includes the following sub-steps of calculating $\Theta_{min}$ and $\Theta_{max}$ values, wherein $\Theta[n]=|Real\{\hat{h}[n]\}|+|Imag\{\hat{h}[n]\}|$, $\Theta_{max}=Max_n\{\Theta[n]\}$, and $\Theta_{min}=Min_n\{\Theta[n]\}$, and determining a desired_RMS_fade value from the $\Theta_{min}$, $\Theta_{max}$, and $\Theta[n]$.

Furthermore, the method of the invention, can also include the step of normalizing the samples, wherein the step of normalizing is performed according to the following expression:

$$\tilde{Y}[n] = \frac{Desired\_RMS\_Fade}{Estimated\_RMS} \cdot Y[n]$$

wherein Y[n] denotes a pre-quantized value of a selected sample and $\tilde{Y}[n]$ denotes a normalized pre-quantized value of the selected sample.

The desired_RMS_fade value can be determined from the $\Theta_{min}$, $\Theta_{max}$, and $\Theta[n]$ according to a look-up table having $\Theta_{max}$, $\sim\Theta_{min}$ at its input and Desired_RMS_Fade at its output.

In accordance with a further aspect of the present invention, there is thus provided a quantizing device for installing in a receiver. The receiver further includes a signal reception unit, a demodulator and a decoder. The receiver receives a signal from a dynamically fading channel wherein the demodulator demodulates the received signal thereby producing a demodulated signal.

The quantizing device includes, a channel fading detection unit, connected to the signal reception unit, for detecting the fading characteristics of the dynamically fading channel, a processor, connected to the channel fading detection unit, for processing the fading characteristics thereby producing a correction command for at least one segment of the received signal and a quantizing unit connected to the processor, the demodulator and the decoder, for quantizing the demodulated signal, thereby producing a quantized signal.

The quantizing unit also corrects the segment according to the correction command and the decoder decodes the quantized signal.

The processor can further provide the correction command to the decoder and thus, the decoder decodes the quantized signal according to the correction command.

The processor determines the correction command by calculating $\Theta_{min}$ and $\Theta_{max}$ values, wherein $\Theta[n]=|\text{Real}\{\hat{h}[n]\}|+|\text{Imag}\{\hat{h}[n]\}|$, $\Theta_{max}=\text{Max}_n\{\Theta[n]\}$, and $\Theta_{min}=\text{Min}_n\{\Theta[n]\}$, and subsequently determining a desired_RMS_fade value from the $\Theta_{min}$, $\Theta_{max}$, and $\Theta[n]$.

The desired_RMS_fade value is determined from the $\Theta_{min}$, $\Theta_{max}$, and $\Theta[n]$ according to a look-up table having $\Theta_{max}-\Theta_{min}$ at its input and Desired_RMS_Fade at its output.

In accordance with yet another aspect of the present invention, there is thus provided a fading compensation device including for installing in a receiver. Such a receiver includes a signal reception unit, a demodulator, a quantizing unit and a decoder. The receiver receives a signal from a dynamically fading channel. The demodulator demodulates the received signal thereby producing a demodulated signal.

The fading compensation device includes a channel fading detection unit, connected to the signal reception unit, for detecting the fading characteristics of the dynamically fading channel, a processor, connected to the channel fading detection unit, for processing the fading characteristics, thereby producing a correction command format least one segment of the received signal and a correction unit, connected to the processor, the demodulator and the quantizing unit, for correcting the demodulated segment corresponding to the segment according to the correction command, thereby producing a corrected segment.

The correction unit replaces the demodulated segment with the corrected segment at the input of the Quantizing unit.

The processor determines the correction command by calculating $\Theta_{min}$ and $\Theta_{max}$ values, wherein $\Theta[n]=|\text{Real}\{\hat{h}[n]\}||\text{Imag}\{\hat{h}[n]\}|$, $\Theta_{max}=\text{Max}_n\{\Theta[n]\}$, and $\Theta_{min}=\text{Min}_n\{\Theta[n]\}$, and subsequently determining a desired_RMS_fade value from the $\Theta_{min}$, $\Theta_{max}$, and $\Theta[n]$.

As described above, the desired_RMS_fade value is determined from the $\Theta_{min}$, $\Theta_{max}$, and $\Theta[n]$ according to a look-up table having $\Theta_{max}-\Theta_{min}$ at its input and Desired_RMS_Fade at its output.

According to another aspect of the invention, the processor is further connected to the decoder, thereby providing the correction command to the decoder for decoding the quantized representation of the corrected segment, with respect to the correction command.

In accordance with a further aspect of the present invention, there is thus provided a receiver which includes a signal reception unit, for receiving a signal from a dynamically fading channel, a demodulator, connected to the signal reception unit, for demodulating the received signal, thereby producing a demodulated signal therefrom, a quantizing processor, connected to the demodulator and to the signal reception unit, for analyzing the received signal and for quantizing the demodulated signal, thereby producing a quantized signal and a decoder, connected to the quantizing processor, for decoding the quantized signal.

The quantizing processor normalizes the demodulated signal according to the estimated fading of the received signal.

It will be noted that the received signal can be, for example, a DS-CDMA signal and wherein the modulator is a rake receiver, and the like. Accordingly, the quantizing processor analyzes the received signal by summing the channel taps of selected fingers.

It will further be noted that the decoder can be a Viterbi decoder and the like.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a novel method which dynamically detects the characteristics of the transmission channel, and accordingly quantizes the received signal into a pre-selected set of alphabet values.

The method according to the present invention, estimates the dynamics of the transmission channel within the received frame, and accordingly provides the quantization strategy.

Figure 5:
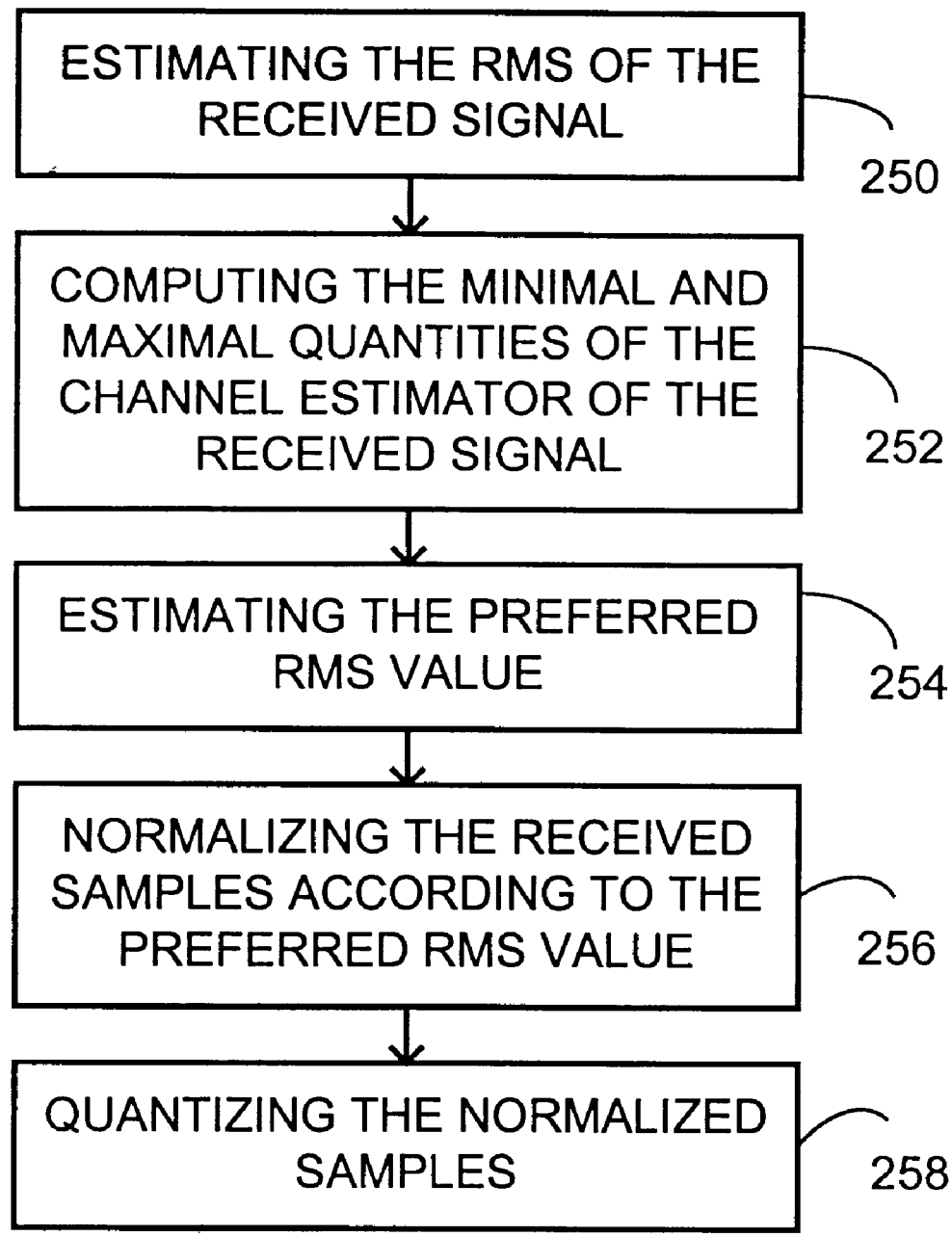
FIG. 5 is a schematic illustration of a method and operative in accordance with a preferred embodiment of the present invention.

Reference is now made to FIG. 5, which is a schematic illustration of a method, operative in accordance with a preferred embodiment of the present invention. The quantizer operates on blocks of N samples. Each of these blocks is processed according to the following steps:

In step 250, the RMS of the received signal is estimated, e.g. according to Equation 4.

In step 252, the quantities $\Theta_{min}$ and $\Theta_{max}$ are computed, where:

$$\Theta_{max} = \text{Max}_n\{\Theta[n]\} \text{ and } \Theta_{min} = \text{Min}_n\{\Theta[n]\} \qquad \text{Equation 7}$$

for $1 \leq n \leq N$, and $\Theta[n]$ is given by $$\Theta[n] = |\text{Real}\{\hat{h}[n]\}| + |\text{Imag}\{\hat{h}[n]\}| \qquad \text{Equation 8}$$

where $\hat{h}[n]$ denotes an estimate of the channel tap value h[n].

In step 254, the Desired_RMS value is determined by $$\text{Desired\_RMS\_Fade} = F(\Theta_{min}, \Theta_{max}) \qquad \text{Equation 9}$$

where F(,) is some function whose purpose is to have Desired_RMS_Fade equal to the Desired_RMS value used for static channels whenever $\Theta_{min}$ and $\Theta_{max}$ are close, and to increase the Desired_RMS value when $\Theta_{min}$ and $\Theta_{max}$ differ.

In step 258, the received samples are normalized according to $$\tilde{Y}[n] = \frac{\text{Desired\_RMS\_Fade}}{\text{Estimated\_RMS}} \cdot Y[n] \qquad \text{Equation 10}$$

In step 258, the normalized samples are quantized by setting $Q(\tilde{Y}[n])$ as the closest value to $\tilde{Y}[in]$ in the predetermined quantizer alphabet.

It will be noted that for static channels (ignoring estimation errors) $\Theta_{min} = \Theta_{max}$. Therefore, the above procedure is reduced to the conventional quantization strategy described hereinabove.

However, if channel gain variations occurred within the received frame, then $\Theta_{min} \neq \Theta_{max}$ and a larger value of Desired_RMS will be utilized, thus emphasizing the fade region as is indeed desirable.

Altogether, the method of the invention provides improved quantization for fading channels without increasing the quantization loss for static channels.

The difference $\Theta_{max} - \Theta_{min}$ can serve as an easily computable measure for the fade variability within the received frame, and in step 254 $F(\Theta_{min}, \Theta_{max})$ can be implemented simply by means of a look-up table having $\Theta_{max} - \Theta_{min}$ at its input and Desired_RMS_Fade at its output.

Different tables may be used when the receiver has to cope with different codes, as is the case for example in IS-95 Rate-set 2 situations where the code properties (puncturing level) may vary from frame to frame depending on the data rate.

The quantization method of the present invention, provides code-pendent channel-dependent quantization, which can be tuned to the specific codes and channel conditions by properly adjusting the look-up table values, so that low quantization loss is achieved over a wide variety of practical scenarios.

According to another aspect of the invention, more complicated functionals can be used to detect the channel fading characteristic. An example for such a functional is given by $\Theta[n] \equiv |\hat{h}[n]|$ that should replace the functional in Equation 8.

This functional is more difficult to calculate but it provides better estimation of the fade variability. According to a further aspect of the invention, the fade duration is measured and incorporated in $F(\Theta_{min}, \Theta_{max})$.

In another preferred embodiment, the demodulator is replaced by the rake receiver. The above quantization procedure remains unchanged, except to the definitions of $\Theta[n]$ in Equation 8, that should now be:

$$\Theta[n] \equiv \sum_{k=1}^{F} |\text{Real}\{\hat{h}_k[n]\}| + |\text{Imag}\{\hat{h}_k[n]\}| \qquad \text{Equation 11}$$

where F denotes the, number of active fingers, and where $\hat{h}[n]$ denotes the channel tap estimator of the k'th finger.

In another preferred embodiment, the data block may be divided into sub-blocks of size $N_1, N_2 \ldots N_k$ such that $$N = \sum_{i=1}^{k} N_i$$

Then, the maximization and minimization in Equation 7 may be performed for each of K sub-blocks, yielding up-to K different values of Desired_RMS_Fade for a given data frame, K is a design paramete. In this situation, the quantizer should provide information, regarding the different gains used within the data block, to the decoder, thus enabling the decoder to compensate these gain variations during the decoding process.

Figure 1:
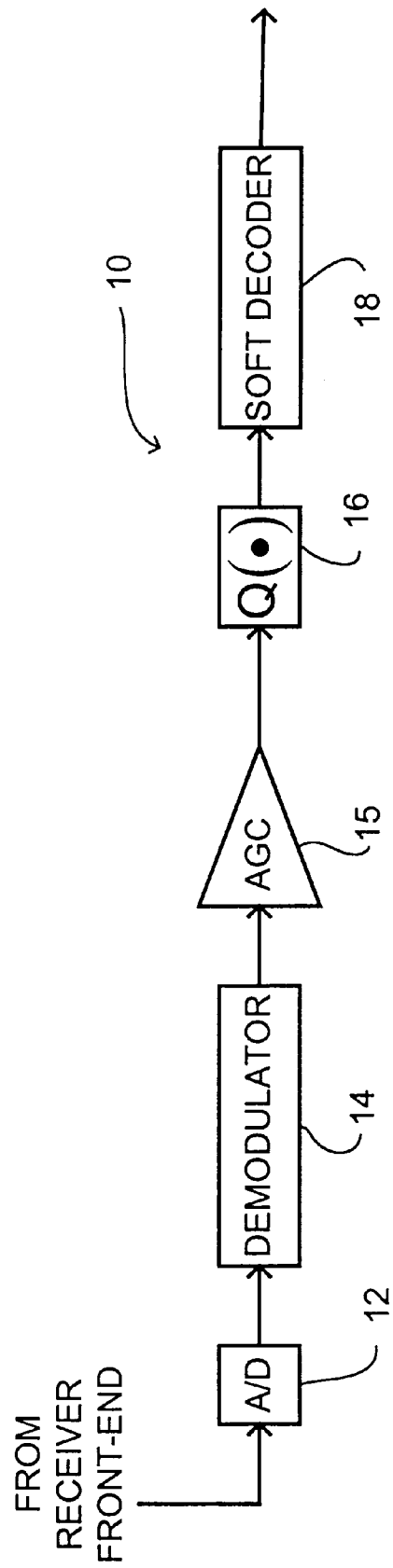
FIG. 1 is a schematic illustration of a signal decoding system, which is known in the art.
Figure 2A:
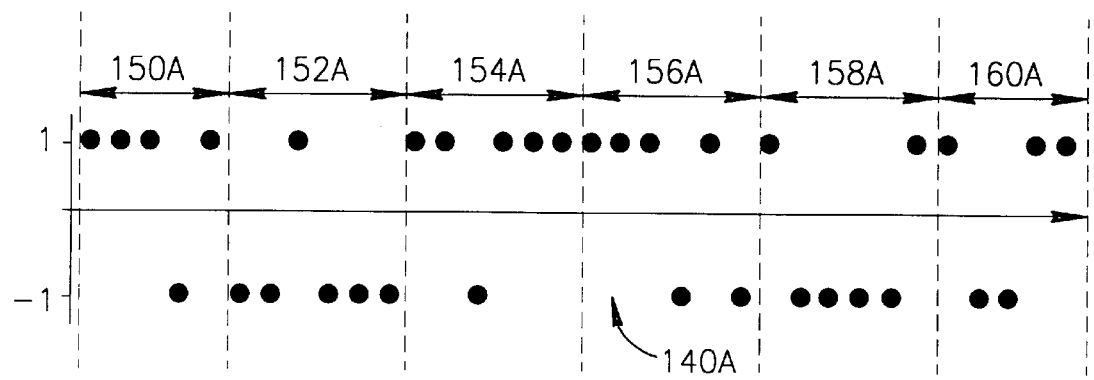
FIG. 2A is an illustration of a frame of a transmitted signal.
Figure 2B:
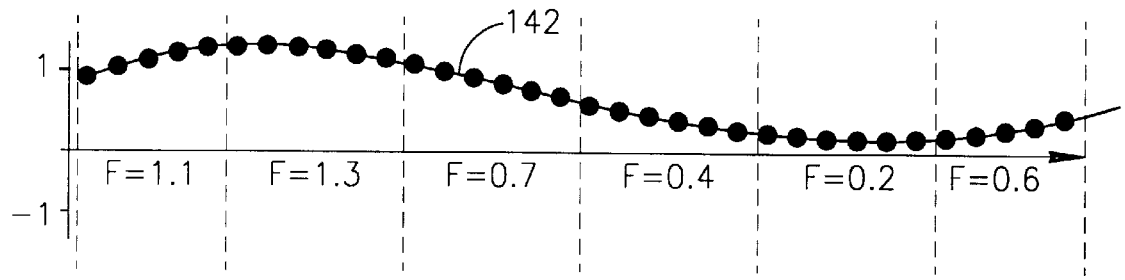
FIG. 2B is an illustration of a dynamically fading channel.
Figure 2C:
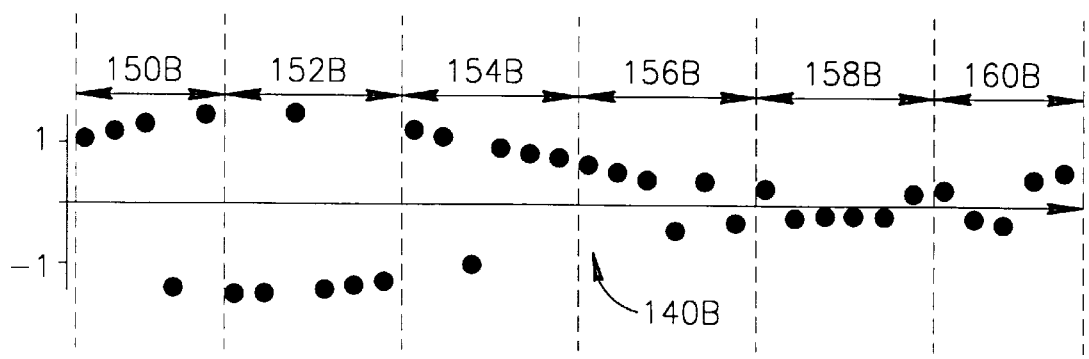
FIG. 2C is an illustration of a frame of a received signal, after traveling through the fading channel of FIG. 2B.
Figure 2D:
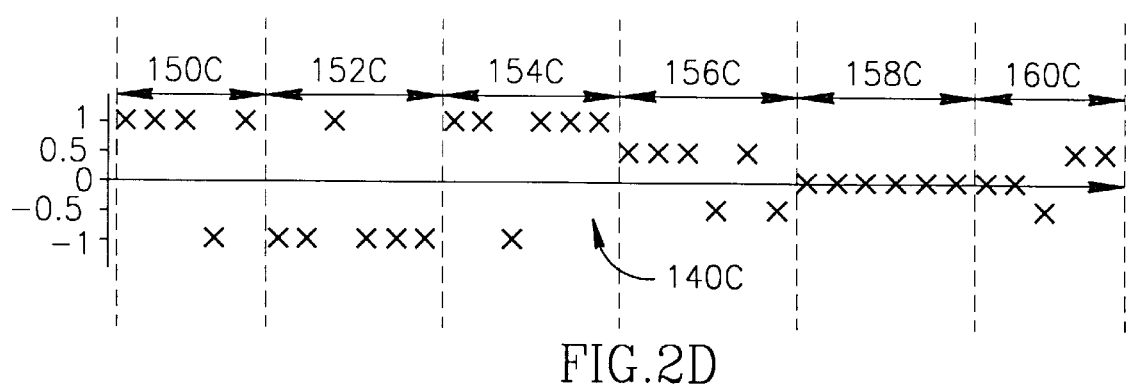
FIG. 2D is an illustration of a quantized frame, produced from the frame of received signal of FIG. 2C.
Figure 3:
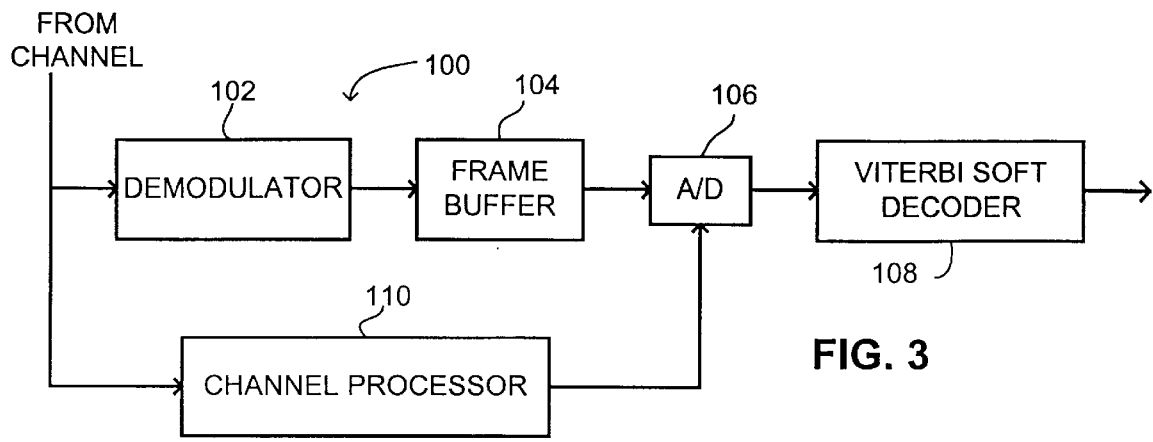
FIG. 3 is a schematic illustration of a receiver, constructed and operative in accordance with a preferred embodiment of the present invention.

Reference is now made to FIG. 3, which is a schematic illustration of a receiver, generally referenced 100, constructed and operative in accordance with a preferred embodiment of the present invention.

Receiver 100 includes a demodulator 102, a frame buffer 104, an analog to digital (A/D) converter 106, a decoder 108 and a channel processor 110. The frame buffer 104 is connected to the A/D converter 106 and to the demodulator 102. The A/D converter 106 is further connected to the channel processor 110 and to the decoder 108.

The receiver 100 receives a signal from an unknown dynamic channel. The demodulator 102 demodulates the received signal and stores the demodulated signal in the frame buffer 104. At the same time, the channel processor 110 analyzes the received signal, thereby detecting the fading characteristics thereof and provides them to the A/D converter 106.

The A/D converter 106 retrieves the demodulated signal and quantzes it according to the fading characteristics. For example, on the one hand, when the fading characteristics indicate that the signal was diminished by the fading channel, then, the A/D converter 106 enhances the demodulated signal before or during the quantization procedure. On the other hand, when the fading characteristics indicate a static (i.e. non fading) channel then, the A/D converter 106 follows the conventional quantization strategy.

Finally, the A/D converter 106 provides the quantized signal to the decoder 108, which in turn decodes it and provides a decoded signal at its output.

Figure 4:
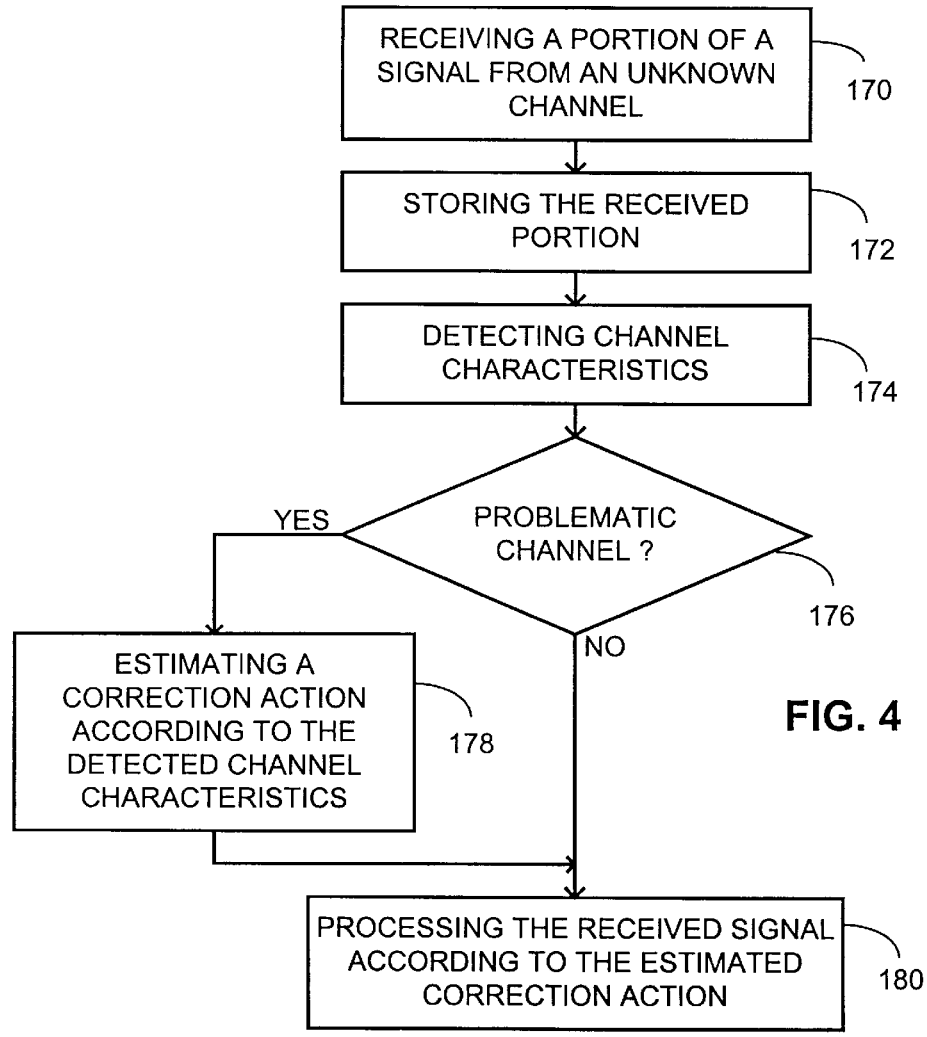
FIG. 4 is a schematic illustration of a method for operating the receiver of FIG. 3, operative in accordance with a preferred embodiment of the present invention.

Reference is now made to FIG. 4, which is a schematic illustration of a method for operating the receiver 100 of FIG. 3.

In step 170, the receiver receives a portion of a signal from an unknown channel, The channel may impose either a diminishing or amplifying effect of the signal, thereby deforming it.

In step 172, the receiver stores the received portion either in the received format or in a demodulated format.

In step 174, the receiver analyzes the received signal, thereby detecting its channel characteristics.

In step 176, the receiver determines from the channel characteristics, if the channel through which the signal traveled, is problematic. If so, then the receiver proceeds to step 178. Otherwise, the receiver proceeds to step 180.

In step 178, the receiver estimates a correction action according to the detected channel characteristics. Then, the receiver proceeds to step 180.

In step 180, the receiver processes the received signal according to the estimated correction action. It will be noted that when the receiver determined that the channel is not problematic, then, the correction action is null.

It will be noted that the present invention can be implemented in many ways. For example, in accordance with a further embodiment of the present invention, there is provided a novel channel quantizer which replaces a conventional quantizer between the demodulator and the decoder.

Figure 6:
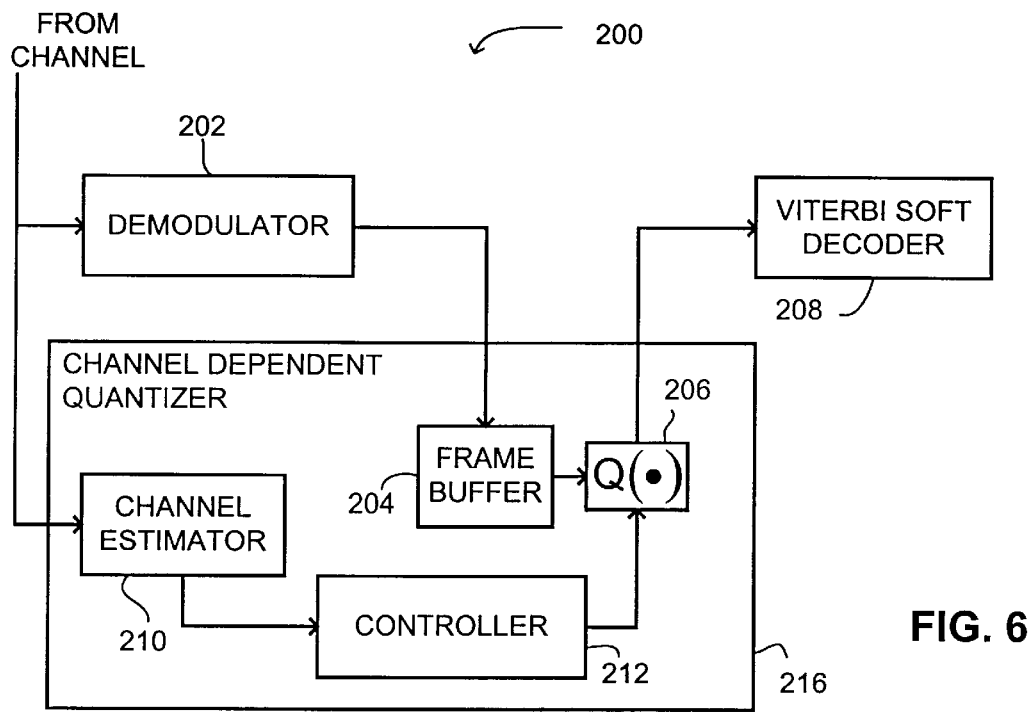
FIG. 6 is a schematic illustration of a receiver, in which there is installed a quantizer, constructed and operative in accordance with a further preferred embodiment of the present invention.

Reference is now made to FIG. 6, which is a schematic illustration of a receiver, generally referenced 200, in which there is installed a quantizer, generally referenced 216, constructed and operative in accordance with a further preferred embodiment of the present invention. The quantizer 216 is connected between a demodulator 202 and a decoder 208. In the present example, the decoder 208 is a Viterbi decoder.

Quantizer 216 includes a channel estimator 210, a controller 212, a frame buffer 204 and a quantizing unit 206. The controller 212 is connected between the quantizing unit 206 and the channel estimator 210. The quantizing unit is also connected to the frame buffer 204.

The channel estimator 210 is further connected to the source of the received signal (e.g. an antenna—not shown) which is also fed into the demodulator 202. The frame buffer 204 is further connected to the demodulator 202. The quantizing unit 206 is further connected to the decoder 208.

The channel estimator 210 detects channel characteristics of a portion of the received signal and provides them to the controller 212. The controller 212 analyses these characteristics thereby determining a set of correction parameters. At the same time, the demodulator 202 demodulates the portion of the received signal and provides the demodulated signal to the quantizer channel dependent quantizer 216, where it is stored in the frame buffer 204.

When the quantizing unit 206 receives the set of correction parameters from the controller 212, it retrieves the respective demodulated signal from the frame buffer 204. Then, the quantizing unit 206 quantizes the demodulated signal according to the set of correction parameters and provides the quantized signal to the decoder 208.

According to another aspect of the present invention, the information regarding the channel characteristics is also used in the decoding stage.

Figure 7:
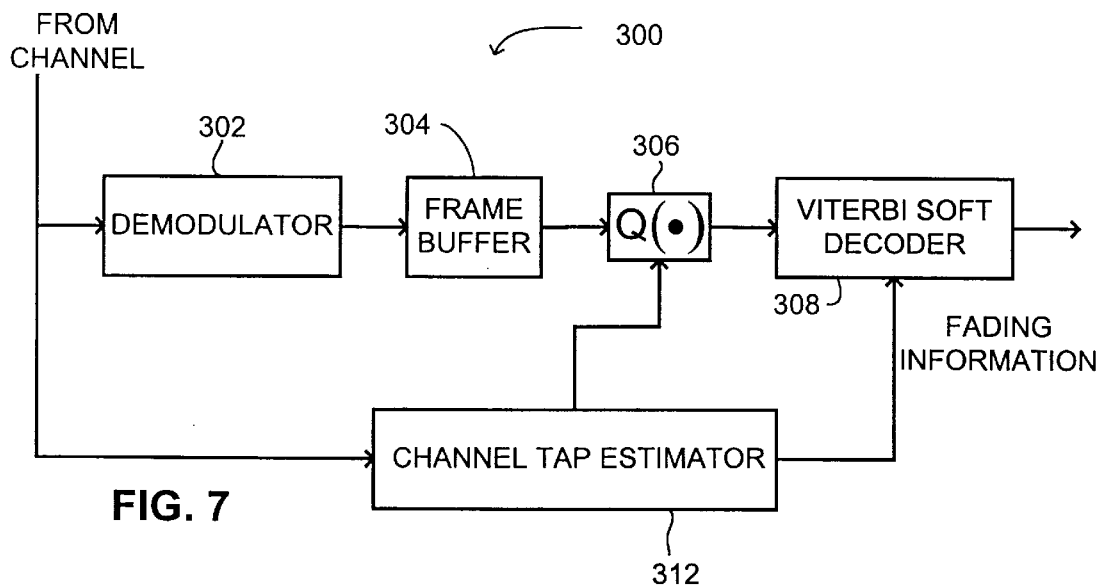
FIG. 7 is a schematic illustration of a receiver, constructed and operative in accordance with another preferred embodiment of the present invention.

Reference is now made to FIG. 7, which is a schematic illustration of a receiver, generally referenced 300, constructed and operative in accordance with a further preferred embodiment of the present invention.

Receiver 300 includes a demodulator 302, a frame buffer 304, a quantizer 306, a decoder 308 and a channel tap estimator 312.

The frame buffer 304 is connected to the demodulator 302 and to the quantizer 306. The Viterbi decoder 308 is connected to the quantizer 306 and to the channel tap estimator 312.

The demodulator 302 and the channel tap estimator 312 receive a portion of a received signal which was transmitted via an unknown. dynamic channel. The demodulator 302 demodulates the received signal and stores the demodulated signal in frame buffer 304. The channel tap estimator 312 analyses the received signal, produces a set of correction parameters and provides them to the quantizer 306 and to the decoder 308.

The quantizer 306 retrieves the demodulated signal from the frame buffer 304 and quantizes it according to the set of correction parameters received from the channel tap estimator 312, thereby producing a quantized signal. Then, the quantizer 306 provides the quantized signal to the decoder 308.

The decoder 308 decodes the quantized signal in view of the set of correction parameter received from the channel tap estimator 312.

It will be appreciated by persons skilled in the art that the present invention is not limited to what has been particularly shown and described hereinabove. Rather the scope of the present invention is defined only by the claims which follow.

I claim:

1. Method for processing a received signal, the signal being received from a dynamically fading channel, the method comprising the steps of:

detecting the fading characteristics of said fading channel;

determining a quantization correction command for at least one segment of said received signal;

quantizing said at least one segment according to said quantization correction command, thereby producing a quantized signal; and decoding said quantized signal, wherein said step of decoding said quantized signal is performed while taking into account said quantization correction command with respect to said at least one segment.

2. The method according to claim 1, further comprising the step of demodulating said received signal.

3. The method according to step 1, wherein said step of detecting comprises the sub-steps of:

estimating the RMS of said received signal; and computing the minimal and maximal quantities of the samples of said received signal.

4. The method according to claim 1, wherein said step of determining comprises the sub-step of estimating a preferred RMS value.

5. The method according to claim 4, further comprising the step of normalizing said received signal according to said preferred RMS value.

6. The method according to claim 1, wherein said step of detecting comprises the following sub-steps:

estimating the RMS of said received signal, thereby producing an Estimated_RMS value, and estimating channel tap values $\hat{h}[n]$ from said received signal.

7. The method according to claim 6, wherein said step of determining comprises the following sub-steps:

calculating $\Theta_{min}$ and $\Theta_{max}$ values, wherein $\Theta[n] = |\text{Real}\{\hat{h}[n]\}| + |\text{Imag}\{\hat{h}[n]\}|$ $\Theta_{max} \equiv \max_n \{\Theta[n]\}$, and $\Theta_{min} \equiv \text{Min}_n \{\Theta[n]\}$, and determining a desired_RMS_fade value from said $\Theta_{min}$, $\Theta_{max}$, and $\Theta[n]$.

8. The method according to claim 6, further comprising the step of normalizing said samples.

9. The method according to claim 8, wherein said step of determining comprises the following sub-steps:

calculating $\Theta_{min}$ and $\Theta_{max}$ values, wherein $\Theta[n] = |\text{Real}\{\hat{h}[n]\}| + |\text{Imag}\{\hat{h}[n]\}|$, $\Theta_{max} \equiv \text{Max}_n \{\Theta[n]\}$, and $\Theta_{min} \equiv \text{Min}_n \{\Theta[n]\}$, and determining a desired_RMS_fade value from said $\Theta_{min}$, $\Theta_{max}$, and $\Theta[n]$ and wherein said step of normalizing is performed according to the following expression:

$$\tilde{Y}[n] = \frac{Desired\_RMS\_Fade}{Estimated\_RMS} \cdot Y[n]$$

wherein Y[n] denotes a pre-quantized value of a selected sample and $\tilde{Y}[n]$ denotes a normalized pre-quantized value of said selected sample.

10. The method according to either of claims 7 and 9, wherein said desired_RMS_fade value is determined from said $\Theta_{min}$, $\Theta_{max}$, and $\Theta[n]$ according to a look-up table having $\Theta_{max}-\Theta_{min}$ at its input and Desired_RMS_Fade at its output.

11. In a receiver which includes a signal reception unit, a demodulator and a decoder, the receiver receiving a signal from a dynamically fading channel, the demodulator demodulating said received signal thereby producing a demodulated signal, a quantizing device comprising:

a channel fading detection unit, connected to said signal reception unit, for detecting the fading characteristics of said dynamically fading channel;

a processor, connected to said channel fading detection unit, for processing said fading characteristics, thereby producing a correction command for at least one segment of said received signal;

a quantizing unit connected to said processor, said demodulator and said decoder, for quantizing said demodulated signal, thereby producing a quantized signal, wherein said quantizing unit also corrects said at least one segment according to said correction command;

wherein said decoder decodes said quantized signal, and wherein said processor provides said correction command to said decoder and said decoder decodes said quantized signal according to said correction command.

12. The quantizing device according to claim 11, wherein said processor determines said correction command by calculating $\Theta_{min}$ and $\Theta_{max}$ values, wherein $\Theta[n]=|Real\{\hat{h}[n]\}|+|Imag\{\hat{h}[n]\}|$, $\Theta_{max}=Max_n\{\Theta[n]\}$, and $\Theta_{min}=Min_n\{\Theta[n]\}$, and subsequently determining a desired_RMS_fade value from $\Theta_{min}$, $\Theta_{max}$, and $\Theta[n]$.

13. The quantizing device according to claim 12, wherein said desired_RMS_fade value is determined from said $\Theta_{min}$, $\Theta_{max}$, and $\Theta[n]$ according to a look-up table having $\Theta_{max}-\Theta_{min}$ at its input and Desired_RMS_Fade at its output.

14. In a receiver which includes a signal reception unit, a demodulator, a quantizing unit and a decoder, the receiver receiving a signal from a dynamically fading channel, the demodulator demodulating said received signal thereby producing a demodulated signal, a fading compensation device comprising:

a channel fading detection unit, connected to said signal reception unit, for detecting the fading characteristics of said dynamically fading channel;

a processor, connected to said channel fading detection unit, for processing said fading characteristics, thereby producing a correction command for at least one segment of said received signal;

a correction unit, connected to said processor, said demodulator and said quantizing unit, for correcting the demodulated segment corresponding to said at least one segment according to said correction command, thereby producing a corrected segment, wherein said correction unit replaces said demodulated segment with said corrected segment at the input of said quantizing unit, and wherein said processor determines said correction command by calculating $\Theta_{min}$ and $\Theta_{max}$ values, wherein $\Theta[n]=|Real\{\hat{h}[n]\}|+|Imag\{\hat{h}[n]\}|$, $\Theta_{max}=Max_n\{\Theta[n]\}$, and $\Theta_{min}=Min_n\{\Theta[n]56$, and subsequently determining a desired RMS fade value from said $\Theta_{min}$, $\Theta_{max}$, and $\Theta[n]$.

15. The quantizing device according to claim 14, wherein said desired__RMS_fade value is determined from said $\Theta_{min}$, $\Theta_{max}$, and $\Theta[n]$ according to a look-up table having $\Theta_{max}-\Theta_{min}$ at its input and Desired_RMS_Fade at its output.

16. The fading compensation device, according to claim 14, wherein said processor is further connected to said decoder, thereby providing said correction command to said decoder for decoding the quantized representation of said corrected segment with respect to said correction command.

17. A receiver comprising:

a signal reception unit, for receiving a signal from a dynamically fading channel;

a demodulator, connected to said signal reception unit, for demodulating said received signal, thereby producing a demodulated signal therefrom;

a quantizing processor, connected to said demodulator and to said signal reception unit, for analyzing said received signal and for quantizing said demodulated signal thereby producing a quantized signal; and a decoder, connected to said quantizing processor, for decoding said quantized signal, wherein said quantizing processor normalizes said demodulated signal according to the estimated fading of said received signal, and wherein said quantizing processor analyzes said received signal by calculating $\Theta_{min}$ and $\Theta_{max}$ values, wherein $\Theta[n]=|Real\{\hat{h}[n]\}|+|Imag\{\hat{h}[n]\}|$, $\Theta_{max}=Max_n\{\Theta[n]\}$, and $\Theta_{min}=Min_n\{\Theta[n]\}$, and subsequently determining a desired RMS fade value from said $\Theta_{min}$, $\Theta_{max}$, and $\Theta[n]$.

18. The receiver according to claim 17, wherein said quantizing processor calculates said desired_RMS_fade value is determined from said $\Theta_{min}$, $\Theta_{max}$, and $\Theta[n]$ according to a look-up table having $\Theta_{max}-\Theta_{min}$ at its input and Desired_RMS_Fade at its output.

* * * * *